(12) United States Patent
Nguyen et al.

(10) Patent No.: US 9,717,095 B2
(45) Date of Patent: Jul. 25, 2017

(54) CONTROL SIGNALLING METHOD

(71) Applicant: NEC Corporation, Minato-ku, Tokyo (JP)

(72) Inventors: Phong Nguyen, Victoria (AU); Yuanrong Lan, Victoria (AU)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/422,453

(22) PCT Filed: Aug. 30, 2013

(86) PCT No.: PCT/JP2013/005137
§ 371 (c)(1),
(2) Date: Feb. 19, 2015

(87) PCT Pub. No.: WO2014/076857
PCT Pub. Date: May 22, 2014

(65) Prior Publication Data
US 2015/0312936 A1    Oct. 29, 2015

(30) Foreign Application Priority Data
Nov. 14, 2012   (AU) ................................ 2012905006

(51) Int. Cl.
*H04L 5/14* (2006.01)
*H04W 72/04* (2009.01)
(Continued)

(52) U.S. Cl.
CPC ...... *H04W 74/002* (2013.01); *H04B 7/15557* (2013.01); *H04L 1/0061* (2013.01);
(Continued)

(58) Field of Classification Search
CPC ..... H04L 5/0007; H04L 5/001; H04L 5/0094; H04L 5/0053; H04L 1/0061;
(Continued)

(56) References Cited

U.S. PATENT DOCUMENTS

2010/0070815 A1    3/2010  Papasakellariou et al.
2012/0320806 A1*  12/2012  Ji ........................ H04B 7/2656
                                                            370/280
2014/0119261 A1*   5/2014  Wang .................... H04W 72/04
                                                            370/312

FOREIGN PATENT DOCUMENTS

CN    WO2012/113131    *  8/2012  ............ H04W 72/00
JP       2010-539847 A    12/2010
(Continued)

OTHER PUBLICATIONS

Dynamic reconfiguration of TDD UL-DL configuration, May 2012, Samsung, 7.10.3, pp. 1-2.*

(Continued)

*Primary Examiner* — Benjamin H Elliott, IV
*Assistant Examiner* — Prince A Mensah

(57) ABSTRACT

According to an exemplary embodiment, a control signalling method in a wireless communications system for reducing false positives, the method comprising: lengthening cyclic redundancy check (CRC) information by assigning at least one predetermined value to at least one downlink control information (DCI) field. As a result, it is possible to reduce the probability of false positive.

13 Claims, 6 Drawing Sheets

(51) Int. Cl.
  *H04W 74/00*  (2009.01)
  *H04L 1/00*   (2006.01)
  *H04B 7/155*  (2006.01)
  *H04L 1/18*   (2006.01)
  *H04W 88/02*  (2009.01)
  *H04W 88/08*  (2009.01)

(52) U.S. Cl.
  CPC ........... *H04L 5/14* (2013.01); *H04W 72/0406* (2013.01); *H04L 1/1887* (2013.01); *H04W 88/02* (2013.01); *H04W 88/08* (2013.01)

(58) Field of Classification Search
  CPC ........ H04L 1/1887; H04L 5/14; H04W 72/04; H04W 72/0446; H04W 72/042; H04W 72/0406; H04W 74/002; H04W 88/02; H04W 88/08
  See application file for complete search history.

(56) References Cited

FOREIGN PATENT DOCUMENTS

WO    2012/019348 A1    2/2012
WO    2012/029244 A1    3/2012

OTHER PUBLICATIONS

Samsung, "Dynamic reconfiguration of TDD UL-DL configuration", 3GPP TSG RAN WG1 Meeting #69 R1-122267, May 21, 2012.
Huawei, HiSilicon, "Methods to support different time scales for TDD UL-DL reconfiguration", 3GPP TSG RAN WG1 Meeting #69 R1-122909, May 21, 2012.
International Search Report for PCT Application No. PCT/JP2013/005137, mailed on Dec. 3, 2013.
Extended European Search Report for EP Application No. EP13855231.0 dated on Nov. 7, 2016.

* cited by examiner

| 400 | | | | | | | | |
|---|---|---|---|---|---|---|---|---|
| 401 { | Gap1 N(DL,RB) | N(DL,VRB) | Nstep | RAB bits | States need | States provided | States left | 11* | 111* |
| | 6 | 6 | 2 | 3 | 6 | 8 | 2 | 6~7 | 7 |
| | 15 | 14 | 2 | 5 | 28 | 32 | 4 | 24~31 | 28~31 |
| | 25 | 24 | 2 | 7 | 78 | 128 | 50 | 96~127 | 112~127 |
| | 50 | 46 | 4 | 7 | 66 | 128 | 62 | 96~127 | 112~127 |
| | 75 | 64 | 4 | 8 | 136 | 256 | 120 | 192~255 | 224~255 |
| | 100 | 96 | 4 | 9 | 300 | 512 | 212 | 384~511 | 448~511 |
| | 110 | 96 | 4 | 9 | 300 | 512 | 212 | 384~511 | 448~511 |
| 402 { | Gap2 N(DL,RB) | N(DL,VRB) | Nstep | RAB bits | States need | States provided | States left | 11* | 111* |
| | 50 | 36 | 4 | 6 | 45 | 64 | 19 | 48~63 | 56~63 |
| | 75 | 64 | 4 | 8 | 136 | 256 | 120 | 192~255 | 224~255 |
| | 100 | 96 | 4 | 9 | 300 | 512 | 212 | 384~511 | 448~511 |
| | 110 | 96 | 4 | 9 | 300 | 512 | 212 | 384~511 | 448~511 |

403 Number of bits for resource block assignment
404 (RAB bits)
405 
406 Nstep
407 Number of redundant states
408 RBA bits starts with "111" are never used

Fig. 4

CONTROL SIGNALLING METHOD

This application is a National Stage Entry of PCT/JP2013/005137 filed on Aug. 30, 2013, which claims priority from Australian Patent Application 2012905006 filed on Nov. 14, 2012, the contents of all of which are incorporated herein by reference, in their entirety.

TECHNICAL FIELD

The present invention relates generally to a control signalling method. In particular, although not necessarily exclusively, the present invention relates to control signalling in wireless networks operating in accordance with the standards (including various releases thereof) applicable to Long Term Evolution (LTE) and LTE-Advanced (LTE-A) systems.

BACKGROUND ART

In LTE and LTE-A systems, downlink (DL) control signals transmitted from a network base station (i.e. from an evolved NodeB or "eNodeB") may be User Equipment (UE)-specific (that is they may be specific to a particular "user equipment" such as a particular wireless terminal or portable communication device), or they may be cell-specific (i.e. broadcast). A UE-specific control signal provides scheduling assignment (SA) for DL data reception at the specific UE and/or uplink (UL) grant for data transmission from the specific UE. Broadcast or cell-specific signalling conveys system information to a group of UEs or all UEs within the cell.

Generally, DL control information (DCI) can be conveyed by Physical Downlink Control Channel (PDCCH) and/or enhanced PDCCH (EPDCCH). It is possible for a transmission to be made using the PDCCH or EPDCCH with associated Physical Downlink Shared Channel(s) (PDSCH(s)). For example, in UE-specific control signalling, the PDCCH carries downlink control information (DCI) for the reception, demodulation and decoding of the associated PDSCH/DL-SCH (DL-SCH stands for Downlink Shared Channel).

It is also possible for transmissions to be made using the PDCCH or EPDCCH alone without associated PDSCH(s). Such so-called "standalone" PDCCH or EPDCCH is used, for instance, in LTE Release 10 (Rel.10) for semi-persistent scheduling (SPS) activation and release. DCI format 0/4, on the other hand, although also without associated PDSCH/DL-SCH transmission, is used for providing UL grant to a UE on UL-SCH/PUSCH (Uplink Shared Channel/Physical Uplink Shared Channel) transmission in the later subframe.

The PDCCH or EPDCCH is capable of broadcasting different types of system information such as System Information Block Type n (SIB-n, n=1, . . . , 13) and/or paging etc. In order to inform a UE of the usage of one PDCCH received in the DL, a specific 16-bit sequence is used to scramble the 16 Cyclic Redundancy Check (CRC) bits of a DCI payload at the eNodeB before transmission, and the UE tries different scrambling sequences after a successful blind decoding. The UE knows the usage of the DCI (e.g. for paging) when the CRC check passes after descrambling using one scrambling sequence (e.g. Paging Radio Network Temporary Identifier (P-RNTI)).

In real systems, false positive detections may occur when a CRC check passes even though it should not. In other words, there is a possibility of a UE falsely/incorrectly considering a PDCCH to be destined to itself. This may occur where the CRC check of the PDCCH by a UE is correct (positive) even though the PDCCH was not, in fact, intended for that UE, i.e. the CRC passes even though there is a UE identifier mismatch. These so-called "false positives" may occur if the effects of transmission errors caused by the radio channel and UE identifier mismatch cancel each other. In other words, such "false positives" can be caused by decoding errors whereby error bits in the DCI bit string and CRC are aligned and allow the CRC check to pass.

Compared to "standalone" PDCCH or EPDCCH (described above), systems in which transmissions are made using the PDCCH or EPDCCH with associated PDSCH(s) may be less impacted by false positive detection. For instance, in systems in which transmissions are made using the PDCCH or EPDCCH with associated PDSCH(s), in the event of a false positive, the UE will mistakenly interpret the information in the detected DCI and try to decode the associated PDSCH(s). It may be possible for the UE to receive but it will unsuccessfully decode the associated PDSCH(s)/DL-SCH. As a result, the UE will either feedback a negative-acknowledge (NAK) if it is a unicast, or discard the received information and try to receive the information in the next interval if it is system broadcast. On the other hand, for "standalone" PDCCH or EPDCCH (i.e. without associated PDSCH(s)/DL-SCH transmission), in the event of a false positive detection, the UE will directly follow the instruction in the detected DCI leading to an incorrect system procedure.

Furthermore, during the process of Rel.8 standardization, "standalone" PDCCH is used for SPS activation/release. This can suffer from false positive detection (as discussed above) and the consequences depend on whether the scheduling assignment (SA) is interpreted as a DL SA or as an UL SA. If a UE incorrectly determines that it has a DL SA, it will fail to decode the presumed data packet transmission from the eNodeB and it will periodically transmit a NAK in the UL of the communication system. This NAK may collide with a NAK or (positive) acknowledge (ACK) transmitted by another UE which has correct PDSCH reception. This is problematic when the UE with the valid PDSCH reception transmits an ACK. Similarly, when an SPS UE incorrectly determines that it has a UL SA; it will transmit data in the UL, which will interfere with data transmitted by one or more other UEs with valid SAs.

In order to reduce the probability of false positive SPS activation for SPS UEs, it has previously been proposed to virtually increase the length of the CRC by setting special fields in the DCI to predetermined values. For example, in US 2010/0070815 A1 it is proposed to set an information element (IE) in a scheduling assignment with determined value and thus extend the effective length of the CRC.

CITATION LIST

Patent Literature

PTL 1: US 2010/0070815 A1

SUMMARY OF INVENTION

Technical Problem

However, in US 2010/0070815 A1, the resultant "virtual CRC" is designed for semi-persistent scheduling (SPS) assignment only. It is therefore not relevant to short term (i.e. fast) Time Division Duplex (TDD) UL-DL configuration indication (as used in systems that support flexible (i.e.

fast and slow) TDD UL-DL configuration), in particular fast TDD UL-DL configuration indication (FCI) via DCI format 1C as discussed below.

In Rel.11 systems and subsequent future systems (Rel.11&beyond systems), it is likely that standalone PDCCH or EPDCCH with DCI format 1C will be reused for sending fast TDD configuration indication (FCI) to UEs with flexible-TDD enabled. Like in the case of SPS activation/release discussed above, for Rel.11&beyond systems it may be desirable to reduce the probability of false positive detection. Otherwise, there may be ambiguity between UE and eNodeB in terms of which TDD configuration is used. For example, if an eNodeB indicates that configuration #5 should be used in the next reconfigure interval but a UE thinks configuration #0 is to be used due to that UE (mis)interpreting a DCI which was actually for another purpose, the said UE will treat certain DL subframes as UL subframes and miss the associated DL transmission. Also, the Hybrid Automatic Repeat reQuest (HARQ)-acknowledgment (ACK) feedback by UE may collide with a NAK or with a positive ACK transmission from a legacy UE or UE with correct TDD configuration indication reception.

It is to be clearly understood that mere reference herein to previous or existing apparatus, products, systems, methods, practices, publications or other information, or to any associated problems or issues, does not constitute an acknowledgement or admission that any of those things, individually or in any combination, formed part of the common general knowledge of those skilled in the field or are admissible related art.

Embodiments of the present invention aim to provide a control signalling method, a wireless communications system, a method for control signalling in a wireless communications, a user equipment and a method implemented in a user equipment (UE) that reduce the probability of false positive.

Solution to Problem

According to one aspect of the present invention, there is provided a control signalling method in a wireless communications system for reducing false positives, the method comprising:

lengthening cyclic redundancy check (CRC) information by assigning at least one predetermined value to at least one downlink control information (DCI) field.

As discussed in the Background section above, the problem associated with standalone PDCCH or EPDCCH for fast TDD configuration indication (FCI), namely the possibility of "false positives", is similar to the problem involving false positives in SPS activation/release. Advantageously, lengthening the CRC information results in more reliable communication between UE and eNodeB, and a reduction in false positives.

SPS activation/release is only conveyed by DCI format 0/1/1A/2/2A/2B/2C which is used for unicast and DCI format 1C is not used to that purpose, which means no related virtual CRC has been designed to enhance the reliability of a standalone PDCCH or EPDCCH with DCI format 1C. In the preferred embodiment, standalone PDCCH or EPDCCH with DCI format 1C scrambled by newly introduced "evolved International Mobile Telecommunications-Advanced (eIMTA)-RNTI" is proposed for fast TDD configuration indication. In order to alleviate the ambiguity between eNodeB and UE in terms of fast TDD configuration, special fields are selected in the DCI format 1C and predetermined values are used to virtually lengthen the CRC bits.

According to another aspect of the present invention, there is provided a wireless communications system: including
at least one base station which is operable to transmit
long term TDD UL-DL configuration indications for use by first user equipments (UEs) which operate in accordance with a long term TDD UL-DL configuration, and
short term TDD UL-DL configuration indications for use by second UEs which can operate in accordance with a short term TDD UL-DL configuration,
wherein the short term TDD UL-DL configuration indications are transmitted in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

In one embodiment, at least some of the second UEs may be able to further operate in accordance with a long term TDD UL-DL configuration.

In regard to the method for indication fast TDD configuration, there was proposed another method as current state of art using "dynamic signalling". In Comparing to the above mentioned fast signalling method that needs one dedicated signalling for FCI, the "dynamic signalling" requires no explicit signalling of FCI. As being stated in R1-121709, assuming a flexible subframe is downlink unless the UE has been signalled to transmit in uplink. Certainly, the timing of predetermined configuration should be followed in order to associate with one subframe when one UL grant is receipted. The main disadvantage of this related art method is that UE is not allowed to send any UL related signalling such as SRS and CQI (Channel Quality Indicator) feedback on flexible subframe unless it has received a corresponding UL grant. As an alternative, the preferred embodiment provides the fast TDD configuration explicitly with dedicated signalling (e.g. DCI format 1C scrambled by "eIMTA-RNTI") while following a "dynamic signalling" procedure when no FCI has been detected at the UE side.

According to another aspect of the present invention, there is provided a method for control signalling in a wireless communications system, the method comprising:
transmitting, from a base station,
long term TDD UL-DL configuration indications for use by first user equipments (UEs) which operate in accordance with a long term TDD UL-DL configuration; and
short term TDD UL-DL configuration indications for use by second UEs which can operate in accordance with a short term TDD UL-DL configuration; and
transmitting the short term TDD UL-DL configuration indications in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

According to another aspect of the present invention, there is provided a user equipment (UE) configured to receive:
long term TDD UL-DL configuration indications for use by first user equipments (UEs) which operate in accordance with a long term TDD UL-DL configuration, and short term TDD UL-DL configuration indications for use by second UEs which can operate in accordance with a short term TDD UL-DL configuration, wherein the short term TDD UL-DL configuration indications are transmitted in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

According to another aspect of the present invention, there is provided a method implemented in a user equipment (UE) used in a wireless communications system, the method comprising:

receiving, from a base station,
long term TDD UL-DL configuration indications for use by first user equipments (UEs) which operate in accordance with a long term TDD UL-DL configuration, and
short term TDD UL-DL configuration indications for use by second UEs which can operate in accordance with a short term TDD UL-DL configuration; and
receiving the short term TDD UL-DL configuration indications in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

Any of the features described herein can be combined in any combination with any one or more of the other features described herein within the scope of the invention.

Advantageous Effects of Invention

According to the present invention, it is possible to reduce the probability of false positive.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 4 is a table containing the usage of Resource Block Assignment (RBA) bits;

DESCRIPTION OF EMBODIMENTS

Figure 1:
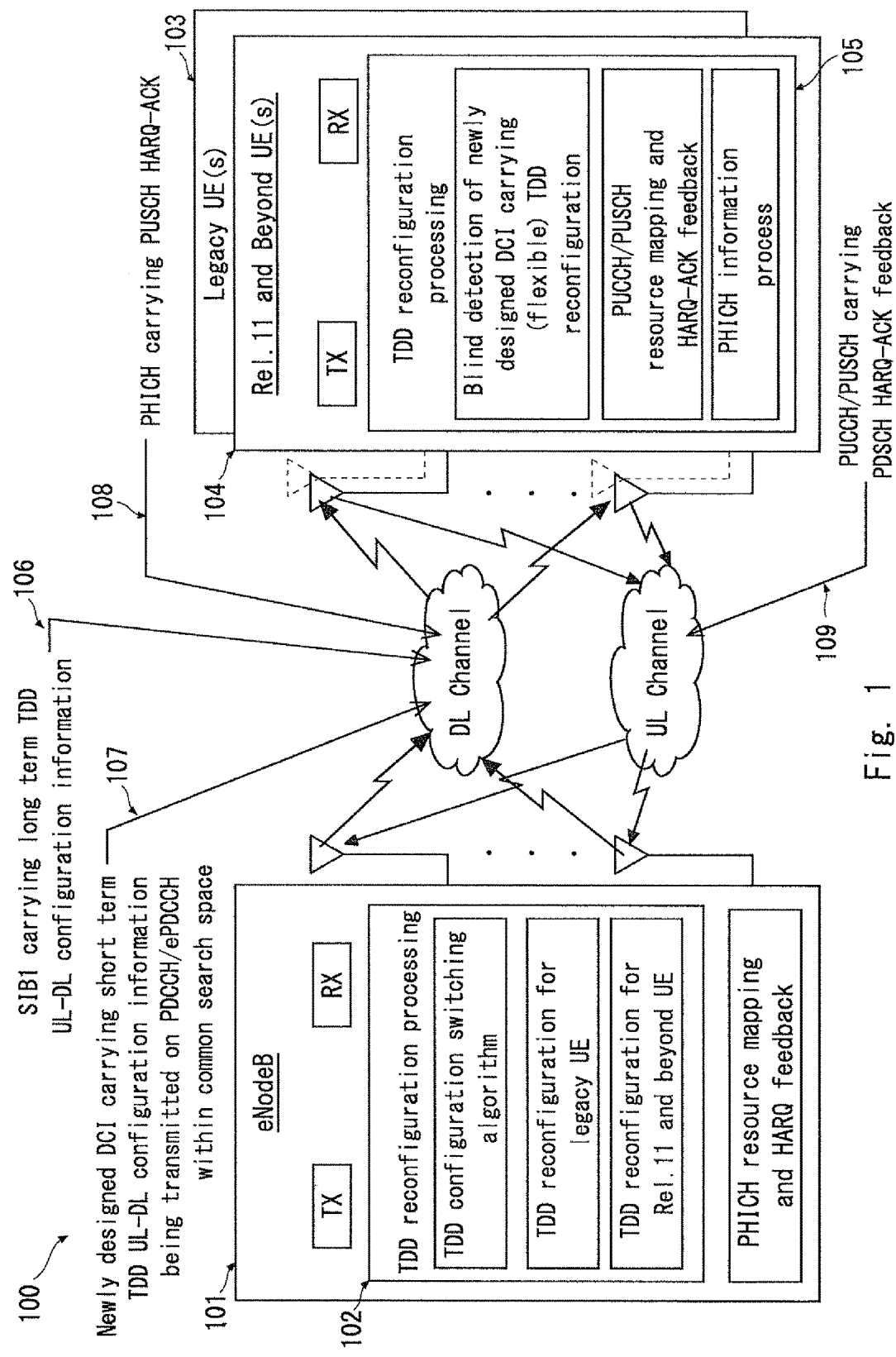
FIG. 1 is a schematic illustration of a wireless communication systems supporting flexible TDD UL-DL configuration.

FIG. 1 illustrates a wireless communication system 100 that supports flexible TDD UL-DL configuration. The depicted wireless communication system 100 includes at least one evolved NodeB (eNB or eNodeB) 101 which provides wireless connectivity and access to a plurality of wireless terminals/portable communication devices (i.e. user equipments or "UEs") 103, 104. In this example, the eNodeB 101 is configured for operation under the LTE release 11 standard and beyond (i.e. it is a "Rel' 11 & beyond eNodeB") but it is also backward compatible with previous releases including Rel'8, Rel'9 and Rel'10. Also, in FIG. 1, the (or each) UE 103 is a legacy UE (i.e. a UE device configured for operation according to LTE Rel'8, Rel'9 and/or Rel'10), whereas the (or each) UE 104 is configured for operation according to LTE Rel'11 (and beyond).

The eNodeB 101 in this instance includes a Time Division Duplex (TDD) reconfiguration processing function (indicated as 102) which takes the UL-DL traffic ratio observed in unrestricted timeframe into consideration when it performs a TDD configuration switching algorithm for the selection of appropriate long term and short term TDD UL-DL configuration for legacy UE(s) 103 and Rel'11&beyond UE(s) 104. In this example the eNodeB 101 broadcasts long term TDD UL-DL configuration to both legacy UE(s) 103 and Rel'11&beyond UE(s) 104 using System Information Block type 1 (SIB1) 106. The TDD UL-DL configuration transmitted on SIB1 is considered a long term configuration as the period for SIB1 update is in the order of 640 ms.

The eNodeB 101 is also configured to communicate short term TDD UL-DL configuration but only to Rel'11&beyond UE(s) 104 using a fast signalling approach. More specifically the eNodeB 101 transmits the short term TDD UL-DL configuration in the form of newly designed Downlink Control Information (DCI) 107 that is transmitted on Physical Downlink Control Channel (PDCCH) or enhanced PDCCH (EPDCCH) within common search space. The CRC of this DCI is scrambled with a new Radio Network Temporary Identifier (RNTI) hereafter referred to as "eIMTA-RNTI" which indicates that the DCI is used for the purpose of fast TDD UL-DL reconfiguration. The TDD UL-DL configuration included on the newly designed DCI is considered a short term configuration as the period for TDD UL-DL configuration update can be as frequent as 10 ms (i.e. radio frame basis). The newly designed "eIMTA-RNTI" will be predefined and may have value in the range of [FFF4: FFFC].

Thus, in the example depicted in FIG. 1, legacy UE(s) 103 operating within the coverage area of an eNodeB 101 (which is configured for Rel'11 and beyond) use TDD UL-DL configuration broadcast on SIB1 and operate according to the legacy specifications to which they comply. The eNodeB 101 may not schedule legacy UE(s) 103 to perform the reception of PDSCH(s) or transmission of PUSCH(s) on flexible subframes. The concept of flexible subframes is discussed in further detail below.

In contrast, Rel'11&beyond UE(s) 104 operating within coverage of the eNodeB 101, in addition to performing the reception and use of TDD UL-DL configuration broadcasted on SIB1, need to process the Short term TDD UL-DL configuration. As shown in this example, the UE(s) 104 configured for operation on Rel'11 and beyond also include a TDD reconfiguration processing function 105 which performs blind detection of the newly designed DCI carrying the updated short term UL-DL configuration information. This function 105 also performs PDSCH H-ARQ encoding and selects the appropriate UL subframe(s) for sending PDSCH H-ARQ feedback to eNodeB 101. PDSCH H-ARQ feedback is carried by Physical Uplink Control Channel (PUCCH)/PUSCH 109.

In addition, in UE(s) 104, the TDD reconfiguration processing function 105 performs the determination of DL subframe on which it will monitor for its UL grant and determination of DL subframe on which it will receive Physical Hybrid Automatic Repeat Request Indicator Channel (PHICH) 108 carrying H-ARQ corresponding to UL-SCH that it sent in previously granted UL-subframe(s).

Embodiments of the present invention utilise virtual CRC extension in DCI format 1C for fast TDD configuration indication (FCI). This is so as to reduce the probability of false positive PDCCH or EPDCCH detection. More specifically, it is intended to reduce the probability of false positive CRC tests on DCI format 1C utilised for fast TDD configuration indication (FCI) while, at the same time, maintaining the same physical CRC size, thus avoiding an increase of the CRC overhead and maintaining the same size as the DCI format 1C used for other purposes in Rel.10. This also assists in maintaining the same number of PDCCH or EPDCCH blind decoding attempts. Embodiments of the present invention also involve selecting special fields in DCI format 1C to be used as virtual CRC bits, and assigning predetermined values for these special fields.

Figure 2:
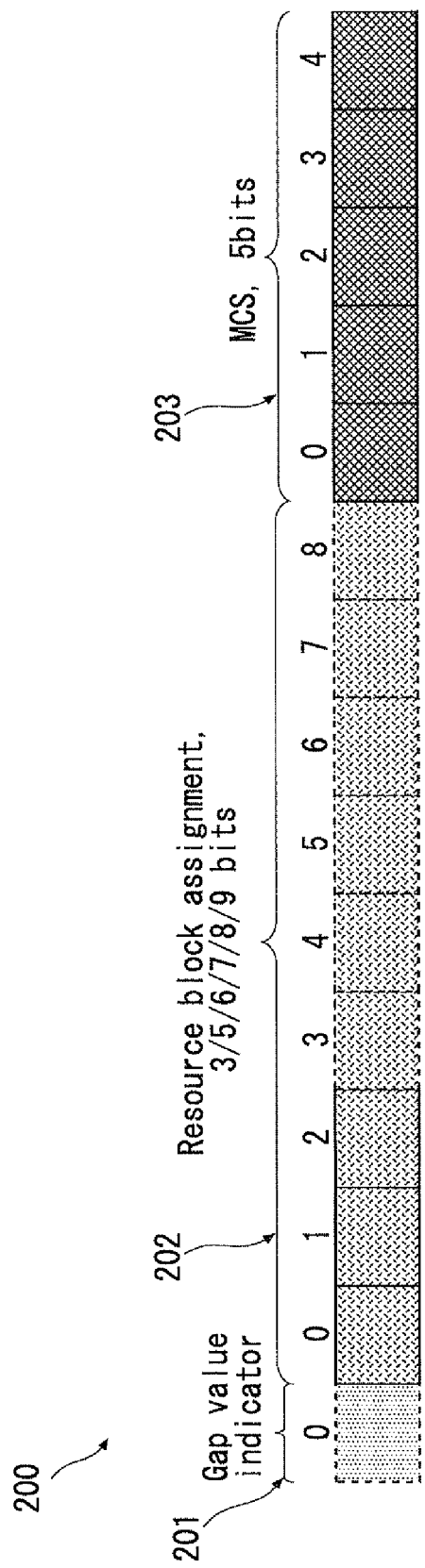
FIG. 2 illustrates the structure of DCI format 1C.

The structure of DCI format 1C is illustrated in FIG. 2. The depicted legacy DCI format 1C structure 200 has three segments 201, 202 and 203 which are used to indicate gap value (201), Resource Block Assignment (RBA) (202) and Modulation and Coding Scheme (MCS) (203) respectively.

The presence of the first segment 201 (which is 1-bit in length) depends on the size of the bandwidth being defined in terms of the Number of Downlink Resource Blocks N(DL,RB). If N(DL,RB) is larger than 50, this segment of 1-bit is used for gap value indication. Otherwise it does not exist.

Figure 3:
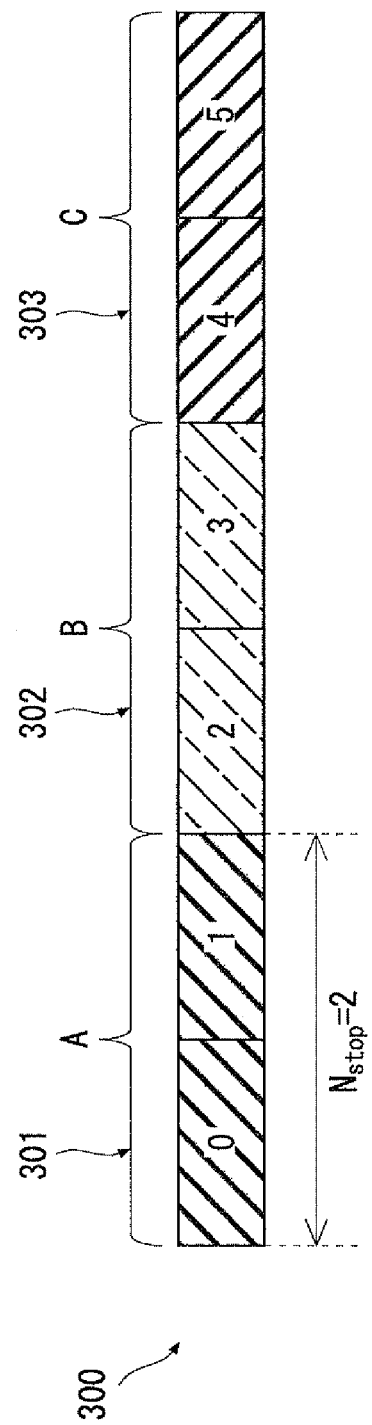
FIG. 3 illustrates possible resource block allocations with resource allocation type 2.

The length of the second segment 202 is between 3 and 9 and is determined by the bandwidth size. It is used to indicate the resource block assigned with resource allocation type 2 for the associated PDSCH transmission. For example, a DL bandwidth with N(DL,RB)=6 (see structure 300 in FIG. 3) can be divide into 3 sub-bands (301,302,302) and the unit of scheduling is one sub-band. As a result, there are a total of 6 different types of resource allocation, namely {A}, {B}, {C}, {A, B}, {B, C}, or {A, B, C} which require at least 3 bits for resource block assignment (RBA) indication.

It is important to note that 3-bits can define 8 different combinations and thus a 3-bit RBA is capable of representing 8 different resource allocations. However, as explained above, in the example of a bandwidth with N(DL,RB)=6, there are a total of 6 different types of resource allocation. Therefore, in this example, there are 2 remaining states which can be represented by the 3-bits that are not used.

The above principle can be extrapolated for larger bandwidth sizes (and hence increased lengths of the second segment 202 of the DCI format 1C structure). The calculation of RBA bits 400 for different gap values 401,402 with different bandwidths 403 is illustrated in FIG. 4. The value of Gap1 401 is supported for all kinds of bandwidth and the value of Gap2 402 is only supported for bandwidths no less than 10 MHz or 50 DL RBs (i.e. N(DL,RB)=50). The number of bits for resource allocation assignment (the number of bits for resource block assignment) 404 is calculated based on the number of 'Virtual Resource Block (VRB)' (N(DL,VRB)) 405 and 'step value' (Nstep) 406 and the corresponding 'number of redundant states' 407 which are not (and have never been) used for Rel.10 UE resource block assignment is calculated correspondingly. RBA states starting with "111" 408 will never be used by Rel.10 system, and the PDCCH of DCI format 1C with RBA states starting with "111" will be discarded by associated Rel.10 UEs as it contains inconsistent information.

The length of the third segment 203 is a fixed 5-bits, which is capable of indicating one out of 32 MCS levels. As stated in section 7.1.7.1 of 3rd Generation Partnership Project (3GPP) Technical Specification (TS) 36.213, "the UE shall use if the DCI CRC is scrambled by P-RNTI, Random Access (RA)-RNTI, or System Information (SI)-RNTI". This mean that MCS is not used for indicating which modulation order is used because quadrature phase-shift keying (QPSK) is fixed as the modulation order for DCI format 1C with CRC scrambled by P-RNTI, RA-RNTI, or SI-RNTI. Instead, the 5-bit MCS information element (IE) is used for indicating the index of Transport Block Size (TBS). As a result, the 5-bit MCS cannot be used as a special field for virtual CRC extension.

Figure 5:
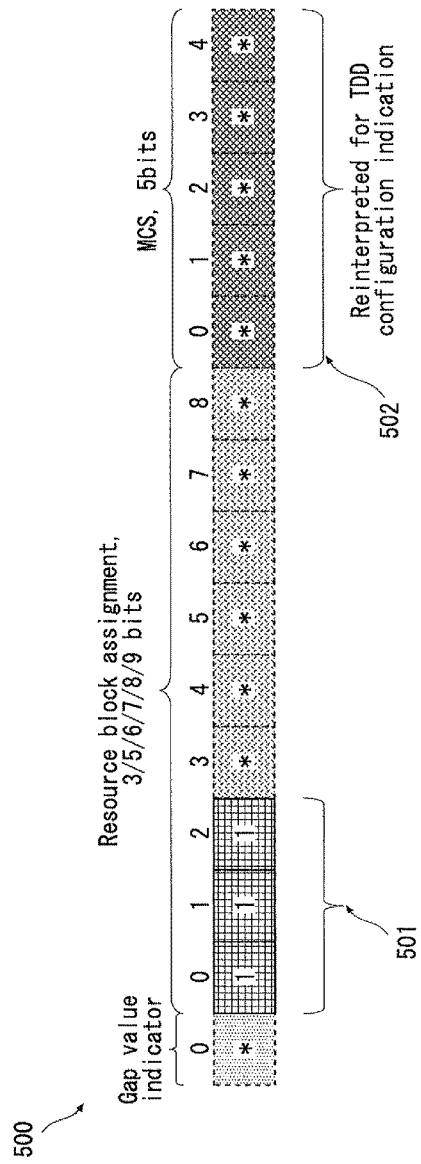
FIG. 5 illustrates a reinterpretation of DCI format 1C for fast TDD configuration indication (FCI)

Hence, referring to FIG. 5, in the current Rel'10 LTE system, if a DCI format 1C 500 passes the CRC check after being descrambled by RA-RNTI/SI-RNTI/P-RNTI, and RBA bits starts with "111" (501) as illustrated, then this PDCCH will be discarded and ignored by Rel.10 UEs.

In the future Rel.11& beyond, if CRC of DCI format 1C as PDCCH or EPDCCH payload, which is scrambled with newly designed "eIMTA-RNTI", is used for indicating fast TDD configuration, then at least the first 3 MSB bits of RBA can be treated as special field with value being set to "1". This may be used to virtually extend the length of CRC for use with associated UEs, and thus more reliable fast TDD configuration is achieved.

It should be noted that more RBA bits can be used as virtual CRC bits as long as it begins with "111". For instance, it is possible to set RBA bits to all "1" in order to achieve up to 9 virtual CRC bits which can further reduce the false positive detection when the DL system bandwidth is 20 MHz. In an extreme, it is possible to set all bits except 5-bit of MCS in DCI format 1C to "1" in order to achieve the longest virtual CRC bits.

A method is provided for selecting fields in DCI format 1C which can be used for fast TDD configuration indication. A gap value indicator may not be present for lower bandwidth, which makes it is unsuitable for fast TDD configuration. The number of RBA bits depends on DL bandwidth and gap value. Different schemes should be designed if the RBA bits are used for fast TDD configuration. For instance, DL bandwidth of 6RB has only 3 bits which are set to "111" as virtual CRC bits, thus there is no additional bits for fast TDD configuration indication. If RBA bits are used for this purpose, at least TDD system with 6RB DL bandwidth should be treated differently.

FIG. 5 shows the reinterpretation of DCI format 1C for fast TDD configuration indication (FCI). The structure 500 has three segments as before which are used to indicate gap value, Resource Block Assignment (RBA) and Modulation and Coding Scheme (MCS) (502) respectively. The size of MCS indication is fixed as 5 bits and 5-bit MCS (502) can be reinterpreted for fast TDD configuration indication. The DCI format 1C detected by UE as scrambled by "eIMTA-RNTI" should be discard and ignored if it contains inconsistent information.

The first 3 Least Significant Bits (LSB) of MCS can be used to indicate one TDD configuration out of 7, or the first 2 LSB can be used to indicate one TDD configuration out of a subgroup of configuration with size no more than 4, the index of the subgroup, on the other hand, can be indicate by using another bit in MCS, or being explicitly deduced from the long term TDD configuration indicated by SIB1 as specified in Rel.10. Any unused bit can be reserved for future use, such as used for FCI for other component carrier when flexible-TDD is enabled for Carrier Aggregation (CA).

The timing for FCI, and the related UE procedure when no fast TDD configuration (FCI) is detected at the UE side is now described.

Figure 6:
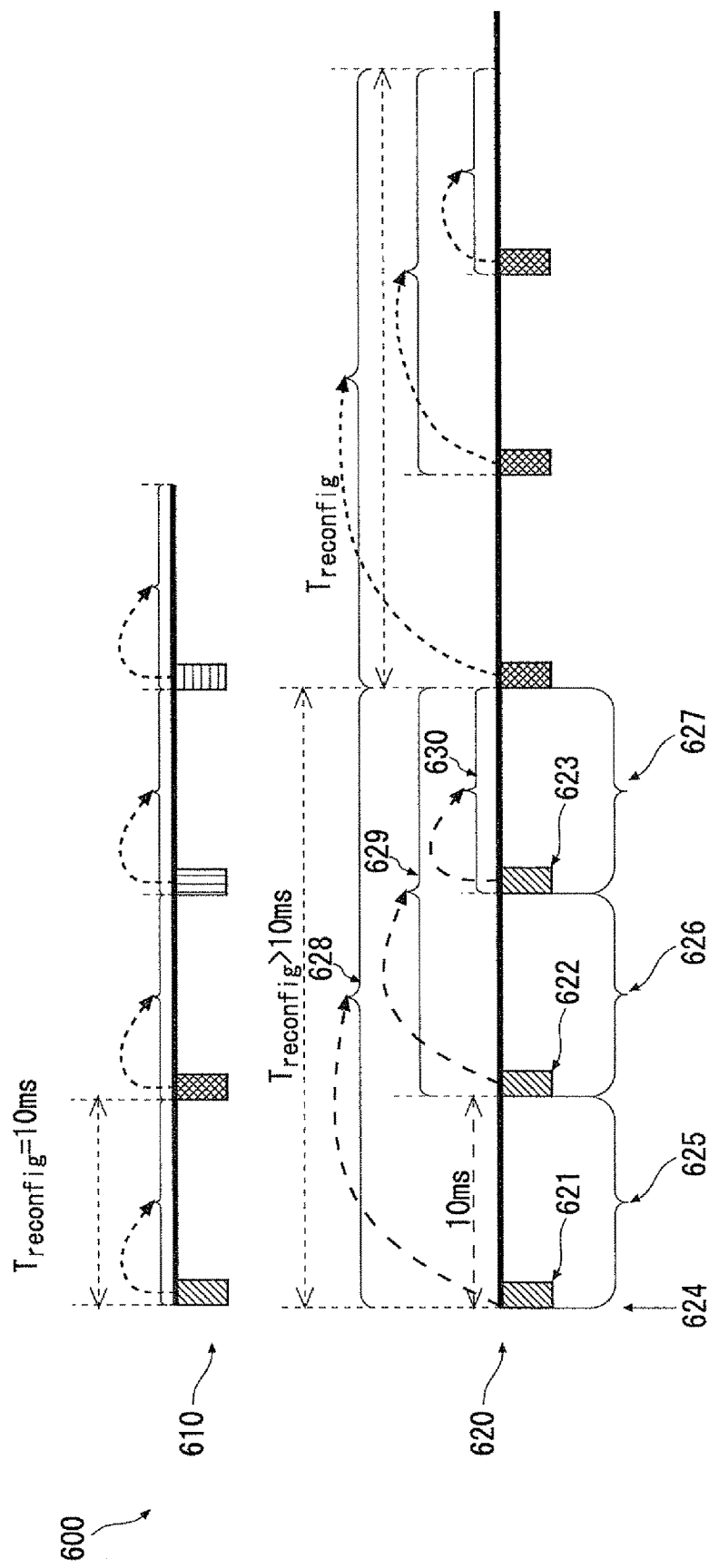
FIG. 6 is a diagram representing timing of fast reconfiguration indication for a flexible TDD system.

Normally it will take at least 2.3 ms from the end of a subframe for UE to process the received PDSCH/DL-SCH on that subframe and approximately 1 ms from the end of the last Orthogonal Frequency Division Multiplexing (OFDM) symbol in the control region of a subframe for a UE to perform blind decoding to detect the Downlink Control Information (DCI) intended for it. It is desirable that the indication should be as close to the next interval as possible, or within the intended interval in order to reflect the latest UL-DL traffic, for instance, the first fixed DL subframe of a radio frame. The timing of FCI transmission (600) for different Reconfiguration Intervals (ReInts) (610,620) is illustrated in FIG. 6. In a process 624 in FIG. 6, the FCI (621) for one ReInt (625) is transmitted in the first fixed DL subframe within its current ReInt, and is repeated in each radio frame (626, 627) within the current ReInt (628). The repeated FCIs 622, and 623 indicate the same FCI as 621. A current ReInt (629) and a current ReInt (630) respectively correspond to a current ReInt of the FCI (622) and a current ReInt of the FCI (623) in FIG. 6. The above mentioned timing for FCI is applicable for ReInt with 10 ms or longer.

UE shall follow the procedure of "dynamic signalling" until it successfully receives FCI. To be specific, if UE hasn't detected FCI in the first radio frame (625) of the ReInt (628), it will follow the procedure of "dynamic signalling" in the first radio frame (625) and try to detect the repeated FCI (622) in the following radio frame (626). If it succeeds in detecting the repeated FCI (622), it (i.e. the UE) will follow the procedure related to this FCI from this radio frame; otherwise the procedure of "dynamic signalling" will still be followed.

"Dynamic signalling", as a prior act, treats the flexible subframe in radio frame as DL subframe unless one UL grant is detected. The DL/UL HARQ timing and UL grant timing should be predetermined in order to avoid the collision of DL/UL HARQ-ACK transmission and UL PUSCH transmission.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The above-mentioned processing may be executed by a computer (for example, UE). Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art. For example, the present invention can be implemented in the following forms.

(1) A control signalling method in a wireless communications system for reducing false positives, the method comprising: lengthening cyclic redundancy check (CRC) information by assigning at least one predetermined value to at least one downlink control information (DCI) field.

(2) The method according to Item (1), in which said DCI field is included within a resource block assignment.

(3) The method according to Item (2), in which the predetermined value involves the use of one or more higher order bits which are not otherwise used.

(4) The method according to Item (3), in which the three highest order bits of the resource block assignment are set to "111" to designate the lengthened CRC.

(5) The method according to Item (1), in which the communications system is an LTE or LTE-A system that supports a flexible time division duplex (TDD) uplink-downlink (UL-DL) configuration.

(6) The method according to any one of Items (1)-(5), further comprising: reconfiguring framing intervals by enabling a user equipment (UE) to operate according to a procedure related to a detected fast TDD configuration indication (FCI) responsive to the detection of a repeated FCI.

(7) The method according to any one of Items (1)-(5), further comprising: discarding, at a first user equipment (UE), a physical downlink control channel (PDCCH) upon detection of said predetermined value of said DCI field.

(8) A wireless communications system including: at least one base station which is operable to transmit long term TDD UL-DL configuration indications for use by first user equipments (UEs) which operate in accordance with a long term TDD UL-DL configuration, and short term TDD UL-DL configuration indications for use by second UEs which can operate in accordance with a short term TDD UL-DL configuration, in which the short term TDD UL-DL configuration indications are transmitted in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(9) The communications system according to Item (8), in which the communications system is an LTE or LTE-A system and the base station is configured for operation in accordance with LTE Release 11 or higher and is backward compatible with earlier Releases.

(10) The communications system according to Item (9), in which the base station is an evolved NodeB (eNodeB) and is backward compatible with at least Release 10, Release 9 and Release 8.

(11) The communications system according to any one of Items (8) to (10), in which the base station performs TDD reconfiguration processing which takes the UL-DL traffic ratio observed in unrestricted timeframe into consideration when it performs a TDD configuration switching algorithm for the selection of appropriate long term and short term TDD UL-DL configuration for first UE(s) and second UE(s).

(12) The communications system according to any one of Items (8) to (10), in which said utilized existing fields in said DCI are not otherwise used and do not need to convey the information contained therein.

(13) The communications system according to any one of Items (8) to (10), in which said DCI field is included within a resource block assignment.

(14) The communications system according to Item (13), in which the predetermined value involves the use of one or more higher order bits which are not otherwise used.

(15) The communications system according to Item (14), in which the three highest order bits of the resource block assignment are set to "111" to designate the virtually lengthened CRC.

(16) The communications system according to any one of Items (8) to (10), in which the second UEs operate according to a procedure related to a detected fast TDD configuration indication (FCI) responsive to the detection of a repeated FCI.

(17) The communications system according to any one of Items (8) to (10), in which the first UEs discard a physical downlink control channel (PDCCH) or an enhanced physical downlink control channel (EPDCCH) upon detection of said predetermined value of said DCI field.

(18) A method for control signalling in a wireless communications system, the method comprising: transmitting, from a base station,
long term TDD UL-DL configuration indications for use by first user equipments (UEs) which operate in accordance with a long term TDD UL-DL configuration, and short term TDD UL-DL configuration indications for use by second UEs which can operate in accordance with a short term TDD UL-DL configuration; and transmitting the short term TDD UL-DL configuration indications in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(19) The method according to Item (18), in which the second UEs operate according to a procedure related to a detected fast TDD configuration indication (FCI) responsive to the detection of a repeated FCI.

(20) The method according to Item (18) or Item (19), in which the first UEs discard a physical downlink control channel (PDCCH) or enhanced physical downlink control channel (EPDCCH) upon detection of said predetermined value of said DCI field.

(21) The method according to Item (18) or Item (19), in which at least some of the second UEs are able to further operate in accordance with a long term TDD UL-DL configuration.

(22) The method according to Item (18) or Item (19), in which the CRC is scrambled with a radio network temporary identifier (RNTI) which the second UEs identify as indicating that the DCI is used for the purpose of fast TDD UL-DL reconfiguration.

(23) The method according to Item (22) in which the RNTI is predefined and has a value in the range of [FFF4: FFFC].

(24) A user equipment (UE) configured to receive: long term TDD UL-DL configuration indications for use by first user equipments (UEs) which operate in accordance with a long term TDD UL-DL configuration, and short term TDD UL-DL configuration indications for use by second UEs which can operate in accordance with a short term TDD UL-DL configuration, in which the short term TDD UL-DL configuration indications are transmitted in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(25) A method implemented in a user equipment (UE) used in a wireless communications system, the method comprising: receiving, from a base station, long term TDD UL-DL configuration indications for use by first user equipments (UEs) which operate in accordance with a long term TDD UL-DL configuration, and short term TDD UL-DL configuration indications for use by second UEs which can operate in accordance with a short term TDD UL-DL configuration; and receiving the short term TDD UL-DL configuration indications in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(26) A control signalling method in a wireless communications system for reducing false positives, the method comprising:
lengthening cyclic redundancy check (CRC) information by assigning at least one predetermined value to at least one downlink control information (DCI) field.

(27) The method according to Item (26), in which said DCI field is included within a resource block assignment.

(28) The method according to Item (27), in which the predetermined value involves the use of one or more higher order bits which are not otherwise used.

(29) The method according to Item (28), in which the three highest order bits of the resource block assignment are set to "111" to designate the lengthened CRC.

(30) The method according to any one of Items (27) to (29), in which the communications system is an LTE or LTE-A system that supports a flexible TDD uplink-downlink (UL-DL) configuration.

(31) The method according to any one of Items (26) to (30), further comprising:
reconfiguring framing intervals by enabling a user equipment (UE) to operate according to a procedure related to a detected fast TDD configuration indication (FCI) responsive to the detection of a repeated FCI.

(32) The method according to any one of Items (26) to (31), further comprising: long term user equipment (UE) discarding a physical downlink control channel (PDCCH) upon detection of said predetermined value of said DCI field.

(33) A wireless communications system that supports flexible TDD uplink-downlink (UL-DL) configuration, the wireless communications system including at least one base station which is operable to transmit:

long term TDD UL-DL configuration indications for use by first user equipments (UEs) which operate in accordance with a long term TDD UL-DL configuration, and also short term TDD UL-DL configuration indications for use by second UEs which can operate in accordance with a short term TDD UL-DL configuration, in which the short term TDD UL-DL configuration indications are transmitted in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(34) The communications system according to Item (33), in which the communications system is an LTE or LTE-A system and the base station is configured for operation in accordance with LTE Release 11 or higher and is also backward compatible with earlier Releases.

(35) The communications system according to Item (34), in which the base station is an evolved NodeB (eNodeB) and is backward compatible with at least Release 10, Release 9 and Release 8.

(36) The communications system according to any one of Items (33) to (35), in which the base station performs TDD reconfiguration processing which takes the UL-DL traffic ratio observed in unrestricted timeframe into consideration when it performs a TDD configuration switching algorithm for the selection of appropriate long term and short term TDD UL-DL configuration for legacy UE(s) 103 and Rel'11&beyond UE(s).

(37) The communications system according to any one of Items (33) to (36), in which said utilized existing fields in said DCI are not otherwise used and do not need to convey the information contained therein.

(38)The communications system according to any one of Items (33) to (37), in which said DCI field is included within a resource block assignment.

(39) The communications system according to Item (38), in which the predetermined value involves the use of one or more higher order bits which are not otherwise used.

(40) The communications system according to Item (39), in which the three highest order bits of the resource block assignment are set to "111" to designate the virtually lengthened CRC.

(41) The communications system according to any one of Items (33) to (40), in which the second UEs operate according to a procedure related to a detected fast TDD configuration indication (FCI) responsive to the detection of a repeated FCI.

(42) The communications system according to any one of Items (33) to (41), in which the first UEs discard a physical downlink control channel (PDCCH) or an enhanced physical downlink control channel (EPDCCH) upon detection of said predetermined value of said DCI field.

(43) A method for control signalling in a wireless communications system that supports flexible TDD UL-DL configuration, the method comprising transmitting from a base station:

long term TDD UL-DL configuration indications for use by first user equipments (UEs) which operate in accordance with a long term TDD UL-DL configuration, and also short term TDD UL-DL configuration indications for use by second UEs which can operate in accordance with a short term TDD UL-DL configuration, the method comprising transmitting the short term TDD UL-DL configuration indications in a downlink control information (DCI) format in which a cyclic redundancy check (CRC) is virtually lengthened by utilizing at least one existing field in said DCI and said field is assigned at least one predetermined value, said virtually lengthened CRC being not utilized by the first UEs and being utilized by the second UEs.

(44) The method according to Item (43), in which the second UEs operate according to a procedure related to a detected fast TDD configuration indication (FCI) responsive to the detection of a repeated FCI.

(45) The method according to Item (43) or (44), in which the first UEs discard a physical downlink control channel (PDCCH) or enhanced physical downlink control channel (EPDCCH) upon detection of said predetermined value of said DCI field.

(46) The method according to any one of Items (43) to (45), in which at least some of the second UEs are able to further operate in accordance with a long term TDD UL-DL configuration.

(47) The method according to any one of Items (43) to (46), in which the CRC is scrambled with a Radio Network Temporary Identifier (RNTI) which the second UEs identify as indicating that the DCI is used for the purpose of fast TDD UL-DL reconfiguration.

(48) The method according to Item (47), in which the RNTI is predefined and has a value in the range of [FFF4: FFFC].

This application is based upon and claims the benefit of priority from Australian provisional patent application No. 2012905006, filed on Nov. 14, 2012, the disclosure of which is incorporated herein in its entirely by reference.

REFERENCE SIGNS LIST

100 WIRELESS COMMUNICATION SYSTEM
101 EVOLVED NODEBS (eNB)
102 TIME DIVISION DUPLEX (TDD) RECONFIGURATION PROCESSING FUNCTION
103, 104 USER EQUIPMENT (UE)
105 TDD RECONFIGURATION PROCESSING FUNCTION
106 SYSTEM INFORMATION BLOCK TYPE 1 (SIB1)
107 DOWNLINK CONTROL INFORMATION (DCI)
108 PHYSICAL HYBRID AUTOMATIC REPEAT REQUEST INDICATOR CHANNEL (PHICH)
109 PHYSICAL UPLINK CONTROL CHANNEL/PHYSICAL UPLINK SHARED CHANNEL (PUCCH/PUSCH)
200 STRUCTURE
201 to 203 SEGMENT
300 STRUCTURE
301 to 303 SUB-BAND
400 CALCULATION OF RBA BITS
401, 402 GAP VALUE
403 BANDWIDTH
404 NUMBER OF BITS FOR RESOURCE BLOCK ASSIGNMENT
405 NUMBER OF VIRTUAL RESOURCE BLOCK
406 NUMBER OF STEP VALUE
407 NUMBER OF REDUNDANT STATES
408 RBA STATES STARTING WITH "111"
500 STRUCTURE
501 RBA BITS
502 MODULATION AND CODING SCHEME (MCS)
600 TIMING OF FAST TDD UL-DL CONFIGURATION INDICATION (FCI) TRANSMISSION 610, 620 RECONFIGURATION INTERVALS
621 to 623 FAST TDD UL-DL CONFIGURATION INDICATION (FCI)
624 PROCESS
625 to 627 RADIO FRAME
628 to 630 CURRENT RECONFIGURATION INTERVAL

What is claimed is:

1. A communications method implemented in a base station used in a wireless communications system, the communications method comprising:
    adding a predetermined value to a downlink (DL) control information (DCI) format notifying time division duplexing (TDD) reconfiguration;
    transmitting, to a user equipment, the DCI format comprising a repeated fast TDD configuration indication (FCI),
    transmitting, to the user equipment, in a first fixed DL subframe in a radio frame, an indication of an uplink (UL)-DL reconfiguration, and
    reconfiguring framing intervals by enabling a user equipment (UE) to operate according to a procedure related to a detected FCI responsive to a detection of the repeated FCI.

2. The communications method as in claim 1, wherein a cyclic redundancy check (CRC) is scrambled by an enhanced interference management and traffic adaptation (eIMTA)-radio network temporary identifier (RNTI) for the DCI format.

3. The communications method as in claim 1, wherein the DCI format comprises a DCI format 1C transmitted in a common search space.

4. The communications method as in claim 1, wherein the indication is in the DCI format.

5. The communications method as in claim 1, wherein the indication is repeated at an interval.

6. The communications method as in claim 5, wherein the interval is 10 ms.

7. The communications method as in claim 5, wherein the interval>10 ms.

8. The communications method as in claim 1, wherein the user equipment follows a fallback solution if the user equipment is unsuccessful in detecting a physical downlink control channel (PDCCH) with a cyclic redundancy check (CRC) scrambled by an enhanced interference management and traffic adaptation (eIMTA)-radio network temporary identifier (RNTI) for the DCI format.

9. A communications method implemented in a user equipment used in a wireless communications system, the communications method comprising:
    receiving from a base station a downlink (DL) control information (DCI) format notifying time division duplexing (TDD) reconfiguration, wherein the DCI format comprises a repeated fast TDD configuration indication (FCI);
    wherein a predetermined value is added to the DCI format;
    receiving, from the base station, in a first fixed DL subframe in a radio frame, an indication of an uplink (UL)-DL reconfiguration; and
    operating according to a procedure related to a detected FCI responsive to a detection of the repeated FCI.

10. A base station used in a wireless communications system, the base station comprising:
    a transmitter configured to transmit to a user equipment (UE) a downlink (DL) control information (DCI) format notifying time division duplexing (TDD) reconfiguration, wherein the DCI format comprises a repeated fast TDD configuration indication (FCI),
    wherein a predetermined value is added to the DCI format,
    wherein the transmitter transmits, to the UE, in a first fixed DL subframe in a radio frame, an indication of an uplink (UL)-DL reconfiguration, and
    wherein the base station further reconfigures framing intervals by enabling the UE to operate according to a procedure related to a detected FCI responsive to a detection of the repeated FCI.

11. A user equipment (UE) used in a wireless communications system, the UE comprising:
    a receiver to receive from a base station a downlink (DL) control information (DCI) format notifying time division duplexing (TDD) reconfiguration, wherein the DCI format comprises a repeated fast TDD configuration indication (FCI),
    wherein a predetermined value is added to the DCI format,
    wherein the receiver receives, from the base station, in a first fixed DL subframe in a radio frame, an indication of an uplink (UL)-DL reconfiguration, and
    wherein the UE operates according to a procedure related to a detected FCI responsive to a detection of the repeated FCI.

12. A communications method implemented in a wireless communications system, the communications method comprising:
    adding a predetermined value to a downlink (DL) control information (DCI) format notifying time division duplexing (TDD) reconfiguration;
    transmitting from a base station to a user equipment (UE) the DCI format comprising a repeated fast TDD configuration indication (FCI);
    transmitting, from the base station to the UE, in a first fixed DL subframe in a radio frame, an indication of an uplink (UL)-DL reconfiguration, and
    the base station reconfiguring framing intervals by enabling the UE to operate according to a procedure related to a detected FCI responsive to a detection of the repeated FCI.

13. A wireless communications system comprising:
    a user equipment (UE); and
    a base station configured to transmit to the UE a downlink (DL) control information (DCI) format notifying time division duplexing (TDD) reconfiguration, wherein the DCI format comprises a repeated fast TDD configuration indication (FCI),
    wherein a predetermined value is added to the DCI format,
    wherein the base station transmits, to the UE, in a first fixed DL subframe in a radio frame, an indication of an uplink (UL)-DL reconfiguration, and
    wherein the base station further reconfigures framing intervals by enabling the UE to operate according to a procedure related to a detected FCI responsive to a detection of the repeated FCI.

* * * * *